United States Patent
Park

(10) Patent No.: US 6,568,773 B1
(45) Date of Patent: May 27, 2003

(54) REFRIGERATOR

(75) Inventor: Il Yoong Park, Kyongsangnam-do (KR)

(73) Assignee: LG Electronics Inc., Seoul (KR)

( * ) Notice: Subject to any disclaimer, the term of this patent is extended or adjusted under 35 U.S.C. 154(b) by 183 days.

(21) Appl. No.: 09/614,720

(22) Filed: Jul. 12, 2000

(30) Foreign Application Priority Data

Aug. 19, 1999 (KR) .............................. 99-34446

(51) Int. Cl.⁷ ................................. F28E 3/12
(52) U.S. Cl. ................... 312/406.1; 165/56; 165/169; 62/454
(58) Field of Search ................ 312/401, 406, 312/406.1, 428; 165/53, 54, 56, 169; 62/454; 220/577

(56) References Cited

U.S. PATENT DOCUMENTS

| | | | | | |
|---|---|---|---|---|---|
| 1,175,376 | A | * | 3/1916 | Patee | 312/406.1 X |
| 1,676,094 | A | * | 7/1928 | Knox | 312/406 X |
| 3,923,355 | A | * | 12/1975 | Dietterich | 312/406.1 X |
| 4,498,713 | A | * | 2/1985 | Fellwock et al. | 312/406.1 X |
| 5,269,601 | A | * | 12/1993 | Williams et al. | 312/406.1 |

\* cited by examiner

*Primary Examiner*—John G. Weiss
*Assistant Examiner*—Michael J. Fisher
(74) *Attorney, Agent, or Firm*—Fleshner & Kim, LLP

(57) ABSTRACT

Refrigerator including a cold air duct fitted in a space stuffed with an insulating material between an inner case and an outer case of the refrigerator having a triangular section in a part facing the inner case for preventing deformation of the inner case in foaming of the insulating material, thereby preventing deformation of the inner case caused by late foaming.

6 Claims, 3 Drawing Sheets

REFRIGERATOR

BACKGROUND OF THE INVENTION

1. Field of the Invention

The present invention relates to a refrigerator, and more particularly, to a refrigerator which can prevent deformation of an inner case caused by insulating material foaming.

2. Background of the Related Art

For a fresh storage of food, an inside temperature of a refrigerator should be kept below a certain temperature. Therefore, in order to conserve cold air formed in the refrigerator and cut off infiltration of an external heat into the refrigerator, insulating material is placed between an inner case and an outer case of the refrigerator during fabrication of the refrigerator. In general, polyurethane foam is used as an insulating material for the refrigerator. The polyurethane foam is a thermosetting resin formed by causing polyester or polyether type polyhydric alcohol and diisocyanic acid ester to make reaction under presence of catalyst, such as water to form polyurethane fiber, when the polyurethane become porous consisting of micrometer units of cells of carbon dioxide freed during the reaction process. In this instance, for accelerating foaming of the polyurethane, a foaming agent is added.

FIG. 1 illustrates section of a part of a refrigerator having a cold air duct(hereafter called as a sidewall duct) for flow of a cold air in the sidewall of the refrigerator from the sidewall toward a door, schematically. The part shows a connection part of the refrigerator sidewall SW having an inner case 2 and an outer case 8, and a door D. The sidewall duct 4 is inside of the sidewall SW. By the way, different from other parts of the refrigerator, such as a rear wall, an upper part, and the like, since the sidewall SW of the refrigerator has a relatively small gap W1 between the inner case 2 and the outer case 8, a gap W2 between the side duct and the inner case 2 is also relatively small. In general, the gap W2 between the side duct 4 and the inner case 2 is in a range of 10 mm. Of the unexplained parts, 'I' denotes a cold air inlet for receiving the cold air from a refrigerating chamber duct(not shown), 'O' denotes a cold air outlet for discharging the cold air toward the door 'D', and 'G' denotes a gasket for maintaining sealing between the refrigerator and the door.

FIG. 2 illustrates a section of a part the sidewall duct 4 is fitted between the inner case 2 and the outer case 8 of the refrigerator. As shown, the sidewall duct 4 has a rectangular section, and a rib 4a at a center thereof for preventing deformation of the sidewall duct 4 caused by foaming pressure during insulating material foaming. The gap W2 between the sidewall duct 4 and the inner case 2 should be in general relatively smaller than a gap W3 between the sidewall duct 4 and the outer case 8, because, as the insulating material between the inner case 2 and the outer case 8 can not cut off an external heat perfectly, there will be a heat loss from the cold air flowing through the sidewall duct 4 if the sidewall duct 4 is deviated toward the outer case 8 out of a preset range, i.e., the gap W3 between the sidewall duct 4 and the outer case 8 becomes narrower than a generally set gap. In the foregoing structure, for insulating the refrigerator, the foaming liquid 6 including the aforementioned foaming material is injected between the inner case 2 and the outer case 8 from one side of the refrigerator, as shown in FIG. 2. Then, the foaming liquid 6 filled between the inner case 2 and the outer case 8 make polyurethane reaction after lapse of a certain time to form foam. Such a foaming causes the polyurethane insulating material to increase its volume compared to the originally injected foaming liquid, to exert a foaming pressure toward the inner case 2.

However, the related art sidewall duct structure of the refrigerator has the following problems. Once the foaming liquid 6 is injected into the sidewall SW of the refrigerator, the foaming liquid flows to one side(to upward in FIG. 2). Since the gap W2 between the sidewall duct 4 and the inner case 2 is relatively smaller than the gap W3 between the sidewall duct 4 and the outer case 8, a flow speed of the foaming liquid 6 flowing through a space between the sidewall duct 4 and the inner case 2 is slower than the foaming liquid flowing through a space between the sidewall duct 4 and the outer case 8. Therefore, the foaming liquid 6 flowed the space between the sidewall duct 4 and the outer case 8 blocks the flow of the foaming liquid 6 in the space between the sidewall duct 4 and the inner case 2, that causes a density of the foaming liquid 6 filled in a space between the sidewall duct 4 and the inner case 2 to be higher than the same in the other part. As a result, the foaming liquid in the space between the sidewall duct 4 and the inner case 2 makes a late foaming in which a foaming liquid keeps foaming even after foaming of the foaming liquid in the other parts is completed. The late foaming builds up a pressure in the space between the sidewall duct 4 and the inner case 2, to deform the inner case 2 of plastic. As a result, as shown in FIG. 3, there is a protruded deformed portion 2a at a left side of the inner case 2.

SUMMARY OF THE INVENTION

Accordingly, the present invention is directed to a refrigerator that substantially obviates one or more of the problems due to limitations and disadvantages of the related art.

An object of the present invention is to provide a refrigerator which can prevent deformation of an inner case caused by foaming of an insulating material between the inner case and the outer case.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the refrigerator includes a cold air duct fitted in a space stuffed with an insulating material between an inner case and an outer case of the refrigerator having a triangular section in a part facing the inner case for preventing deformation of the inner case in foaming of the insulating material, thereby preventing deformation of the inner case caused by late foaming.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings. A refrigerator in accordance with a first preferred embodiment of the present invention will be explained with reference to FIG. 4. The refrigerator of the present invention suggests to modify a form of the cold air duct between the inner case 2 and the outer case 8, for minimizing a relatively smaller portion of the gap between the cold air duct and the inner case 2. Herein, a sidewall duct 14 will be taken as an example of one kind of the cold air duct.

Figure 1:
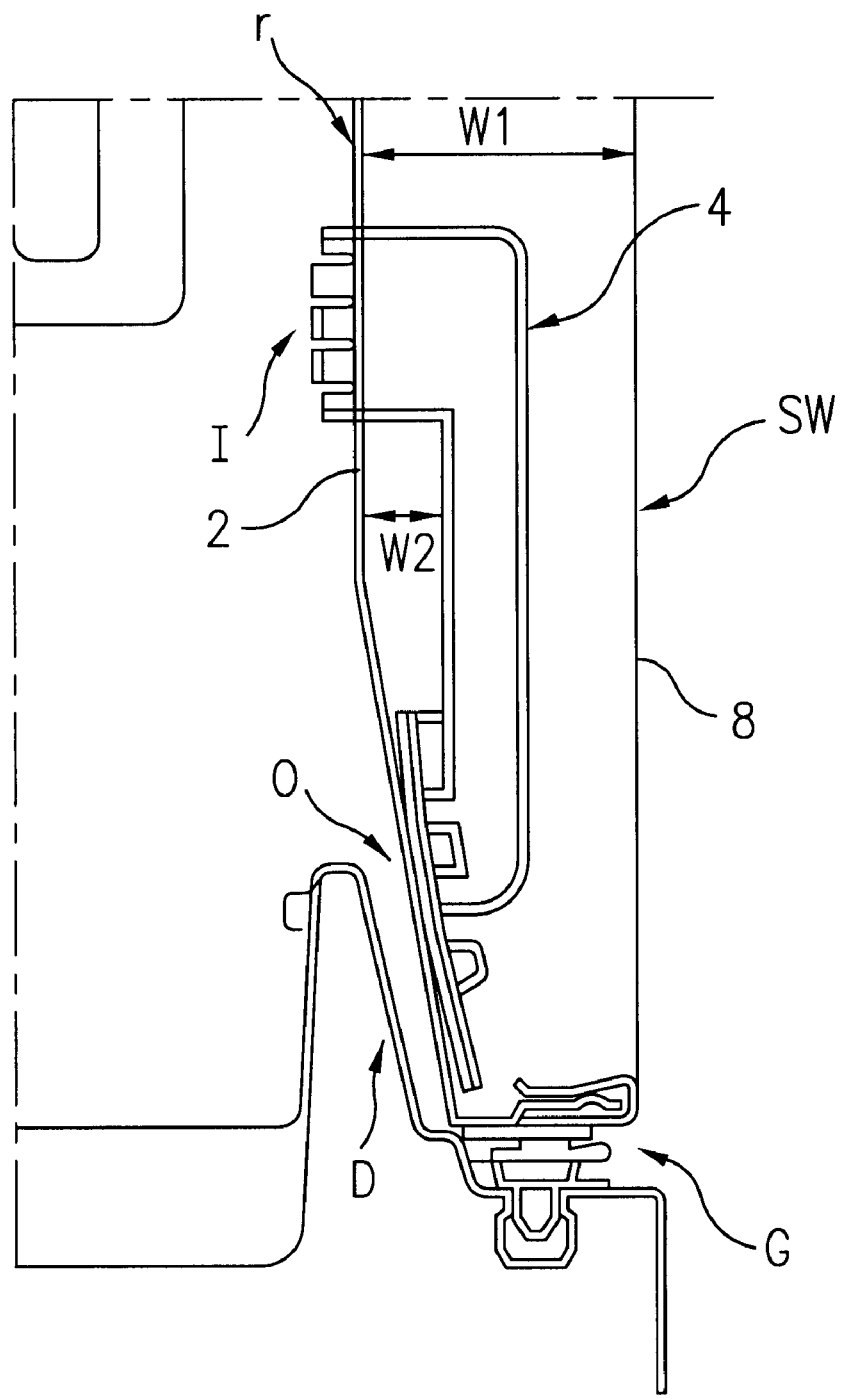
FIG. 1 illustrates a section showing a sidewall duct structure of a related art refrigerator, schematically.
Figure 2:
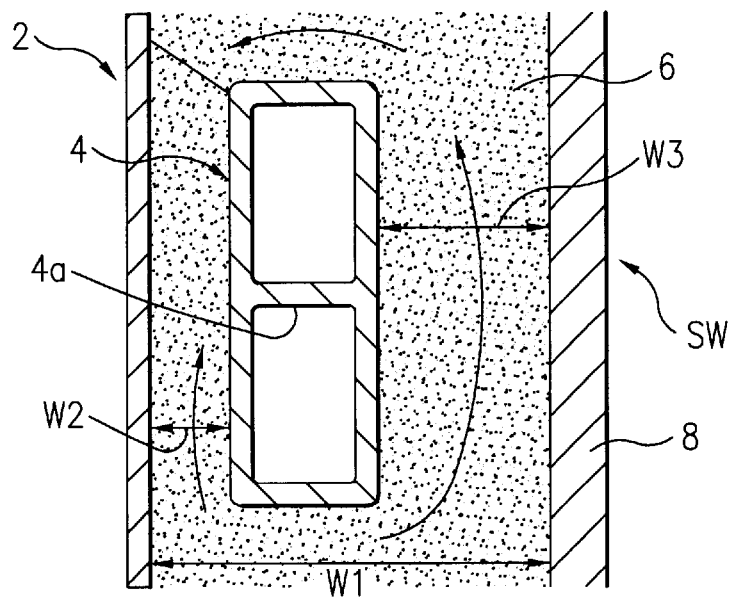
FIG. 2 illustrates a section showing a foaming liquid being filled in a sidewall duct structure of a related art refrigerator.
Figure 3:
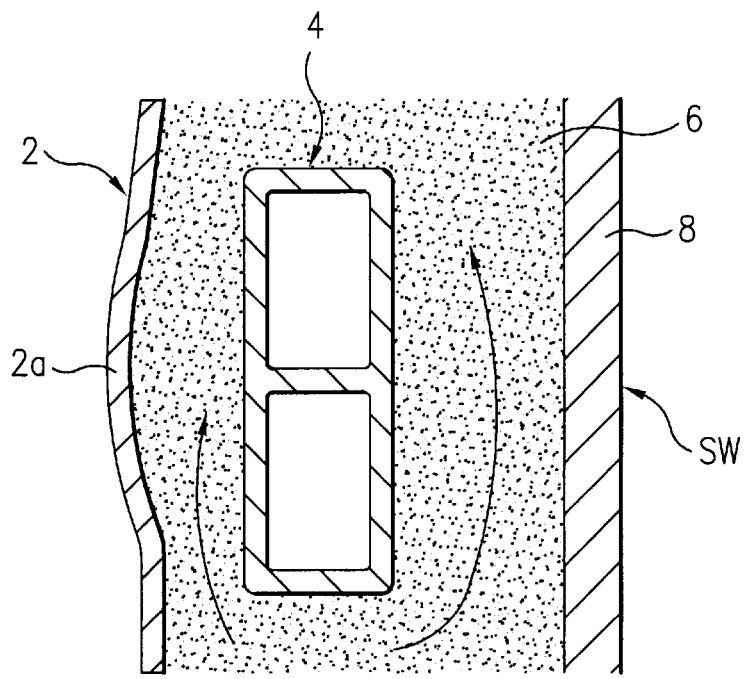
FIG. 3 illustrates a section showing a foaming liquid after hardened in a sidewall duct structure of a related art refrigerator.

The sidewall duct 14 has a section of triangle, substantially, and, preferably, of a isosceles triangle with a low height, because the isosceles triangle with a low height has a low resistance against a flow of the foaming liquid in the sidewall SW, and induces homogeneous foaming. As explained, a gap W3' between the sidewall duct 14 and the outer case 8 has almost the same with the gap W3 (see FIG. 2) between the related art rectangular sidewall duct 4(see FIG. 2) and the outer case 8, taking a heat loss of the cold air flowing in the sidewall duct 14 into consideration. The sidewall duct 14 is fitted such that an apex 14a of the isosceles 14b of the sidewall duct 14 faces the inner case 2, for minimizing a portion more foaming pressure exerts thereto in foaming between the inner case 2 and the sidewall duct 14.

The action of the aforementioned refrigerator of the present invention will be explained.

Figure 4:
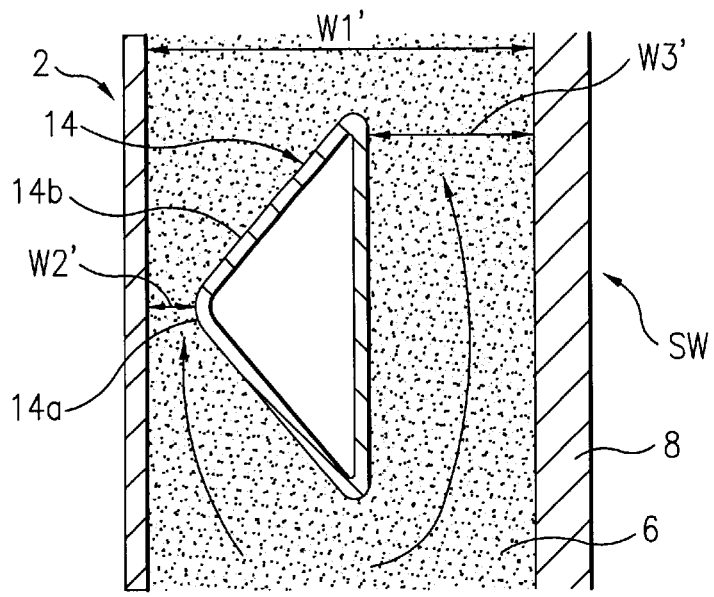
FIG. 4 illustrates a section showing a sidewall duct of a refrigerator in accordance with a first preferred embodiment of the present invention; and, FIG. 5 illustrates a section showing a sidewall duct of a refrigerator in accordance with a second preferred embodiment of the present invention.

Referring to FIG. 4, upon injecting a foaming liquid 6 into inside of the sidewall SW of the refrigerator, i.e., between the inner case 2 and the outer case 8, the foaming liquid advances in a direction of arrow on the drawing. When the foaming liquid reaches to the sidewall duct 14, the foaming liquid 6 is divided into two portions. By the way, different from the related art, since the sidewall duct 14 is triangular, a resistance against the advance of the foaming liquid 6 between the sidewall duct 4 and the inner case 2 is lower than the case the related art rectangular sidewall duct is fitted. Therefore a flow speed of the foaming liquid 6 flowing between the sidewall duct 14 and the outer case 8 is almost the same with a flow speed flowing between the sidewall duct 14 and the inner case 2. Consequently, the concentration of the foaming liquid 6 between the sidewall duct 14 and the inner case 2 is not occurred as the foaming liquid 6 advanced between the sidewall duct 14 and the outer case 8 does not block the flow of the foaming liquid 6 advancing between the sidewall duct 14 and the inner case 2.

Figure 5:
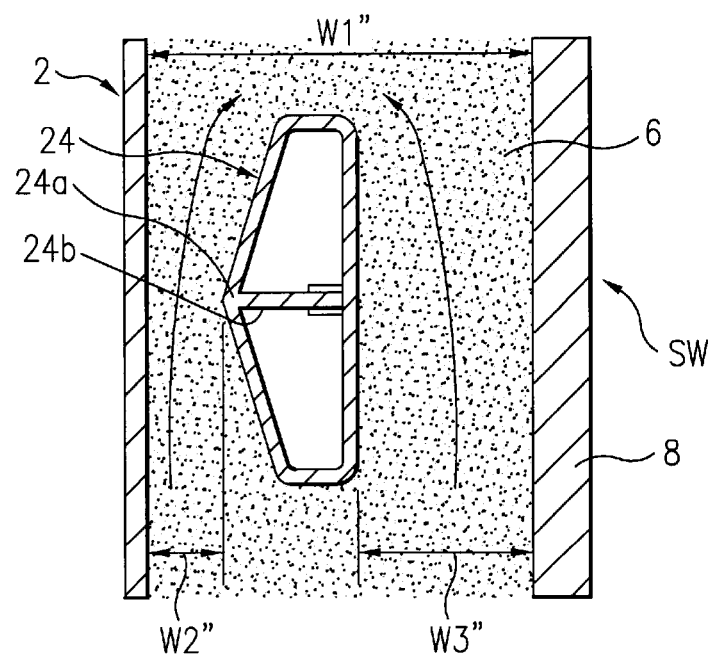

In the meantime, FIG. 5 illustrates another embodiment of the sidewall duct in accordance with a preferred embodiment of the present invention, wherein the sidewall duct 24 has a form of combined sections of an isosceles triangular section and a rectangular section, with an apex of the isosceles triangular section disposed to face the inner case 2. Alike the first embodiment, this second embodiment has a gap W3" between the sidewall duct 24 and the outer case 8 almost the same with the gap W3(see FIG. 2) between the related art rectangular sidewall duct 4(see FIG. 2) and the outer case 8. And, a minimum gap between the sidewall duct 24 and the inner case 2, i.e., a gap W2" between the apex 24a of the triangle facing the inner case 2 and the inner case 2 is almost the same with the gap W2(see FIG. 2) between the related art sidewall duct 4(see FIG. 2) and the inner case 2. Accordingly, alike the aforementioned first embodiment, the foregoing sidewall duct 24 can also minimize a portion more forming pressure exerts thereto in foaming between the inner case 2 and the sidewall duct 24.

A detailed explanation of the action of the aforementioned refrigerator having the sidewall duct 24 will be omitted because the action can be understandable adequately if the action of the first embodiment is referred. Though a sidewall duct is taken as an example up to now, the present invention is not limited to this, but is applicable to any cold air duct fitted inside of a refrigerator for flow of the cold air.

As explained, because the triangular cold air duct in the present invention is formed such that a portion of a gap between the cold air duct and the inner case relatively smaller than a gap between the cold air duct and the outer case is minimized, the late foaming of the foaming liquid, with consequential deformation of the inner case, caused by a relatively smaller gap between the cold air duct and the inner case can be prevented.

It will be apparent to those skilled in the art that various modifications and variations can be made in the refrigerator of the present invention without departing from the spirit or scope of the invention. Thus, it is intended that the present invention cover the modifications and variations of this invention provided they come within the scope of the appended claims and their equivalents.

What is claimed is:

1. A refrigerator, comprising:

an outer casing;

an inner casing disposed within the outer casing with a gap therebetween;

an enclosed cold air duct disposed within the gap having input and output passages configured to provide a flow of cold air therethrough, the duct being configured to communicate with an inner space of the refrigerator through the inner case; and an insulating material disposed within the gap and surrounding the cold air duct, wherein a portion of the cold air duct facing the inner casing is substantially triangular in cross-section, wherein an apex of the portion of the cold air duct which is substantially triangular in cross-section faces the inner casing so as to prevent deformation of the inner casing due to pressure resulting from the insulating material.

2. The refrigerator as claimed in claim 1, wherein the insulating material comprises a foaming insulating material.

3. The refrigerator as claimed in claim 1, wherein a distance between the cold air duct and the outer casing is larger than a distance between the cold air duct and the inner casing.

4. The refrigerator as claimed in claim 1, wherein the cold air duct is triangular in cross section.

5. The refrigerator as claimed in claim 1, wherein the cold air duct comprises a triangular section and a rectangular section, in cross section.

6. A refrigerator, comprising:

an outer casing;

an inner casing disposed within the outer casing with a gap therebetween;

an enclosed cold air duct disposed within the gap having input and output passages configured to provide a flow of cold air therethrough, the duct being configured to communicate with an inner space of the refrigerator through the inner case; and an insulating material disposed within the gap and surrounding the cold air duct, wherein a portion of the cold air duct facing the inner casing is substantially triangular in cross-section, wherein the cold air duct comprises a triangular section and a rectangular section, in cross section, and wherein the cold air duct comprises a rib extending between an apex of the triangular section and a central portion of the rectangular section.

* * * * *